Dec. 9, 1969  H. P. GREGOR  3,483,036
FUEL CELL WITH ION EXCHANGE ELECTROLYTE
Filed Aug. 19, 1966
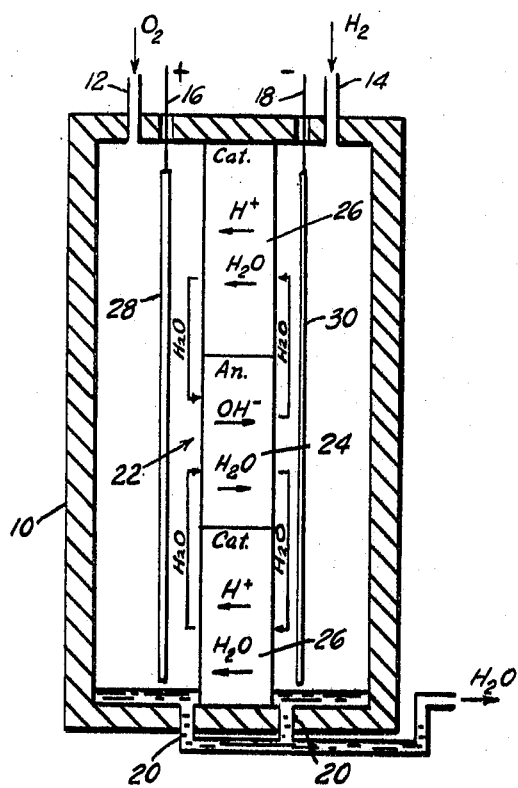
HARRY P. GREGOR
INVENTOR.
BY
ATTORNEY

United States Patent Office 3,483,036
Patented Dec. 9, 1969

3,483,036
FUEL CELL WITH ION EXCHANGE ELECTROLYTE
Harry P. Gregor, 150 Lakeview Ave., Leonia, N.J. 07605
Continuation-in-part of application Ser. No. 196,624, May 22, 1962. This application Aug. 19, 1966, Ser. No. 573,666
Int. Cl. H01m 27/00
U.S. Cl. 136—86                                    8 Claims

ABSTRACT OF THE DISCLOSURE

A fuel cell characterized by an electrolyte in the form of a membrane between the electrodes, wherein the electrolyte membrane has cation-exchange areas and anion-exchange areas, so that electro-osmotic water transport to the membrane faces is equalized, and flooding of one face, with drying of the other, is eliminated.

---

This is in part a continuation of my copending application Ser. No. 196,624, filed May 22, 1962, which is now abandoned.

This invention relates to fuel cells. In a particular, this invention relates to an improved fuel cell provided with an improved electrolyte membrane which overcomes the tendency of conventional fuel cell membranes to become flooded on one side and dry on the other by reason of electro-osmotic water transport.

Basically, a fuel cell is an electrochemical cell provided with a pair of electrodes, an electrolyte, generally in the form of a solid membrane of ion-exchange resin or polymer between said electrodes and in intimate contact with both of them, and provision for supplying one of the components of an oxidation-reduction reaction system to each of the electrodes. In a typical example, the electrodes are made of a spongy sintered metal material ( e.g. sintered nickel), the electrolyte is a membrane of an ion-exchange resin such as sulfonated polystyrene, and the reactants are hydrogen and oxygen, the latter being in pure form or as air. At the positive electrode, oxygen comes in contact with a hydrogen ion on the surface of the electrolyte membrane, and reacts with it to form water, the oxygen being reduced in the process and absorbing two electrons for each atom of oxygen so reacting. The electrons are supplied by the positive electrode.

At the negative electrode, gaseous hydrogen comes in contact with the electrode, and is oxidized to hydrogen ions, producing two electrons per mole of gas. These hydrogen ions at the surface of the electrode are in contact with the electrolyte membrane, and they enter the membrane replacing hydrogen ions removed from the opposite side of the membrane by the other electrode reaction. For each molecule (two atoms) of gaseous hydrogen so reacting at the negative electrode, a corresponding pair of hydrogen ions reacts with gaseous oxygen at the positive electrode to form water. In the process, each oxygen atom absorbs two electrons from the positive electrode. Obviously, if the electrodes are externally electrically connected, a current will flow from one to the other through the external connection. As the current flows, hydrogen ions migrate from the negative to the positive electrode through the electrode membrane and water is continuously formed at the positive electrode side.

Many other fuels and many other types of electrolyte material may be used, but the overall mechanism in each case is similar to that just described. In some fuel cells, the resin employed as the electrolyte is an anion-exchanging resin, containing the poly-N-vinyl-3-methyl-imidazolium exchange group, for example, in which case the hydroxyl ion formed at the positive electrode migrates to the negative electrode and reacts with hydrogen to form water, the resin being used in the hydroxide form. In such a cell, the face nearest the negative electrode is the wet side, and that near the positive electrode is the dry side of the electrolyte film. Similarly, fuels other than hydrogen are frequently employed, for example methanol.

It is also possible to construct fuel cells without membranes, having each of the electrodes, together with its associated fuel or oxidant supply, simply immersed in a body of liquid electrolyte. The use of an ion-exchange membrane electrolyte, however, provides many advantages. Such a membrane carries the ionic products of the electrode reactions from one electrode to the other across a series of fixed-charge groups. Therefore, ordinary concentration polarization where the electrolyte is depleted near one or both of the electrodes, is not present and therefore does not constitute a problem. Further, ion-exchange membrane electrolytes, being available in the form of sheets of thicknesses ranging from a few microns to several millimeters or even higher, are convenient to use in the construction of fuel cells. When properly constructed, they are impermeable to gaseous fuels in the gas state, can be fixed readily between electrodes or current collectors, and lend themselves to the simple construction of fuel cells. Further, it has been found possible to treat the surfaces of these ion-exchange membrane electrolytes with catalysts so that the active area for the electrode reaction is greatly increased.

Despite the above advantages, ion-exchange membrane electrolytes suffer from one disadvantage, in that the passage of the ionic current across the cell carries along with it solvent, usually, water. This water, which may include water of hydration, moves in the direction of the ionic current, and a hydrodynamic water envelope also is carried along with the ions, due to the viscous drag of water on the ions. This phenomenon, commonly known as electro-osmosis, is well known to exist in ion-exchange membranes and other kinds of membranes. In the conventional ion-exchange membrane electrolyte, electro-osmosis acts to move the solvent or water from one membrane surface or electrode to the other. The resulting loss of water from one surface acts to dry out the surface and indeed an appreciable portion through the thickness of the membrane, and this causes an increase in electrical resistance in these dried-out or partially dried-out regions. The proper functioning of an ion-exchange membrane electrolyte requires that the ions be highly mobile, and loss of solvent brings about a loss in ionic mobility.

Numerous methods have been proposed to overcome the tendency of ion-exchange membranes used as fuel-cell electrolytes to dry out on one side by reason of electro-osmosis. For example, water (or other solvent, depending on the system employed), can be fed externally to the membrane at the surface from which it is being withdrawn by electro-osmosis. It is also possible to provide an external wick to carry water by capillary action from the wet back to the dry side of the membrane. Such methods, however, require additional equipment and involve additional difficulties in providing properly-controlled amounts and distribution of the water applied to the dry side, and complicate the construction of the cell.

Conventional ion-exchange membrane electrolyte technology has heretofore concentrated its attempts to alleviate the electroosmotic water transport problem on several approaches. Membranes of higher ionic concentration and therefore of higher water absorptivity have been proposed. Attempts have been made to use denser membranes of higher hydrodynamic resistance. While such procedures may diminish water transport somewhat, they do not eliminate it, and the tendency for one side of the membrane to become flooded while the other dries out is merely slowed down, not avoided.

An object of this invention, therefore, is to provide an improved fuel cell. Another object is to provide an improved ion-exchange membrane for use as the electrolyte in a fuel cell. Still another object is to provide improved means for overcoming the tendency of fuel-cell diaphragms to become dry on one side by reason of electroosmosis. Another and particular object of this invention is to provide means for transporting water internally in a fuel-cell ion-exchange membrane from the normally-wet to the normally-dry side of the membrane. Other objects and advantages of the present invention will become apparent from the following more complete description and claims.

The above and other objects are achieved by the present invention, whereby solvent or water is transported from the normally-wet to the normally-dry side of the membrane internally, i.e. through the membrane itself, by a system of pores or regions where the flow of water is opposite in direction to the flow of the principal ionic current.

In one particularly desirable embodiment, this invention contemplates a fuel cell comprising in combination a positive electrode, a negative electrode, means for supplying an oxidant to said positive electrode, means for supplying a fuel to said negative electrode, and an electrolyte between said electrodes and in contact with both of said electrodes, said electrolyte being composed of a solid mass of ion-exchange resin having a plurality of regions including a first region having fixed ions of one electrical sign in association with exchangeable ions of opposite electrical sign, and a second region having fixed ions of electrical sign opposite the sign of the fixed ions in said first region, in association with exchangeable ions of electrical sign opposite the sign of the exchangeable ions in said first region.

In another particularly desirable embodiment, this invention contemplates a composite ion-exchange film having a plurality of discrete regions, each of said regions being of a thickness coextensive with the thickness of the film, said regions including a first region having fixed ions of one electrical sign in association with exchangeable ions of opposite electrical sign, and a second region having fixed ions of electrical sign opposite the sign of the fixed ions in said first region, in association with exchangeable ions of electrical sign opposite the sign of the exchangeable ions in said first region.

In a typical form, the membrane according to this invention may be made of alternating strips of cation-exchange resin and anion-exchange resin disposed in side-by-side, edge-to-edge relationship (with or without a slight overlap to facilitate sealing) joined together by heat-sealing or in any convenient manner so as to provide a composite membrane having cationic regions coextensive with the thickness of the film and anionic regions also coextensive with the thickness of the film.

Referring now to the drawing, the single figure is a largely diagrammatic representation, partly in section and partly in exploded form, of a fuel cell according to the invention.

As shown in the drawing, such a cell may comprise a suitable outer container 10 provided with suitable inlets 12 and 14 for oxidizer and fuel respectively and electrical leads 16 and 18 for drawing off the electrical energy generated in the cell. The cell is also provided with suitable means such as outlets 20 for drawing off the water produced by the fuel cell reaction.

The interior of the cell is divided into two compartments by an ion-exchange membrane 22, comprising at least one anion-selective portion 24 and at least one cation-selective portion 26 (in the apparatus as illustrated, there are two such portions).

In one of the chambers, namely the chamber into which the oxidizer is fed, is a positive electrode 28 which may be made for example of sintered nickel or the like. Alternatively, the positive electrode may be a conductive metal plate, for example of copper or silver. In this event, the adjacent face of the membrane is preferably provided with a coating of sintered nickel or other high surface-area, electrically-conductive material.

Similarly, in the chamber on the other side of the membrane, there is provided a negative electrode 30, which also may be made of sintered nickel or the like, or of a conductive plate, as in the case of the positive electrode, in the latter case, preferably in contact with a sintered metal coating on the adjacent face of the membrane. The positive electrode is connected to electrical lead 16 and the negative electrode to electrical lead 18.

In the drawing, the electrodes are shown as being somewhat separated from the adjacent faces of the membrane, in order to facilitate showing the manner in which water flows over the surface of the membrane from a wet surface to a neighboring dry surface. It should be understood, however, that in actual practice, the electrodes are normally disposed in close contact with the faces of the membrane.

Also, the representation of the membrane is schematic rather than pictorial, being vastly exaggerated in thickness relative to the other components of the cell, for the purpose of indicating the directions of ion migration and electroosmotic water transport in the various regions of the membrane. The membrane, moreover, is shown as comprising one anionic and two cationic portions. One of each species would suffice to provide an operable cell according to the invention. In practice, it is preferred to provide a substantial number of anionic and alternating cationic regions, to minimize the flow path of water over the surface of the membrane from a wet portion of a face to the neighboring dry portion thereof.

Various kinds of polymers have been used as the basic or "matrix" polymer in preparing ion-exchange membranes for use as electrolytes in fuel cells. Phenol-formaldehyde and similar condensation resins have been employed successfully, although they tend to be somewhat unstable compared to other matrix polymers. Polystyrene is favored because of its stability and ease of chemical substitution. Other matrix polymers such as polyacrylonitrile, polyethylene and polyvinyl chloride are commonly used and are of high stability. However, under the conditions of use in a fuel cell with the attendant anodic oxidation processes, the presence of oxidation catalysts, local heating and the presence of oxidizing (perhydroxyl) radicals, even these matrix polymers are subject to attack. It appeares that particularly stable matrix polymers contribute to the chemical stability of ion-exchange membranes even when the same exchange group is involved, and fluorinated matrix polymers have been used for this reason. In general, a wide variety of polymers are applicable for use as ion-exchange electrolytes in fuel cells, and are useful in the present invention. The principal requirements are that the polymer have ion-exchange groups in its structure, or be capable of modification so as to introduce such groups, and that the polymer, with such groups present, be reasonably stable to the environmental conditions imposed by fuel-cell operations. Many polymers meeting these conditions are well known to the art.

The matrix polymer is converted to an ion-exchange polymer by introducing into its structure (if not already present) ion-exchange groups. An ion-exchange group may be defined as a substituent group, a portion of which is capable of ionizing and thus becoming mobile, while the remainder of the group remains attached to the matrix polymer, constituting a fixed ion of opposite sign to that of the mobile (exchangeable) ion. The portion of the substituent group which remains attached to the matrix polymer is called a "fixed" ion, and the portion which dissociates to form a free, mobile ion in the surrounding medium is called an "exchangeable" ion, because of the facility with which it can be replaced by another ion to satisfy the charge of the fixed ion, and the case with which it can migrate through the resin from one fixed ion to another.

Some groups which may be introduced into the matrix polymer structure are such that, upon subsequent ionization, they dissociate into a mobile or exchangeable cation and a fixed anion. Typical of these "cation-exchange" groups is the sulfonic acid group. Carboxylic acid-substituted polymers may also be used, but are less desirable because their acidity is lower and, on an equivalent basis, their resistance is higher. Moreover, their water-holding capacity is considerably lower than that of the sulfonates. In such cation-exchange resins, the exchangeable cation is a hydrogen ion.

Other groups, which may be introduced into the matrix polymers are such that on subsequent ionization, they dissociate into a mobile or exchangeable anion and a fixed cation. Such groups are in general quaternary ammonium groups, and the exchangeable anion is a hydroxyl ion. Typical fixed groups are of the benzyltrimethylammonium or imidazolium types. Tertiary amines are more stable than the quaternary ammonium substituents, and may be used to advantage in high-temperature applications; however, they are weak bases and are subject to the same difficulties that attend the use of weak acid membranes, so that their use is ordinarily not advantageous.

In accordance with the present invention, the problem of water transport by electro-osmosis is solved by providing a composite membrane having a plurality of regions which differ in their characteristics in that at least one region has the characteristics of a cation-exchange membrane, and conducts the electric current by migration of positive ions, for example, hydrogen ions, from the negative toward the positive electrode side of the membrane, and at least one other region has the characteristics of an anion-exchange membrane, and conducts the current (in the same direction as the current in the first-named region), by migration of hydroxyl groups from the positive and toward the negative electrode side of the electrolytic membrane.

With the composite membrane just described, two major differences from the behavior of the conventional membrane are at once apparent. In the first place, water produced in a fuel cell using the conventional type of membrane is produced entirely at one side of the diaphragm. Thus, when the ion-exchange group is a cation-conducting group, the electrical current is carried by migration of hydrogen ions through the electrolyte membrane, and water is produced when the hydrogen ions, after completing this migration, come into contact with hydroxyl ions produced at the side of the membrane in contact with the positive electrode, so that all of the reaction-product water is produced at the positive electrode. Conversely, when the resin is an anion-conducting resin, the electrical conduction is by migration of hydroxyl ions, and all of the water is produced at the negative electrode. Using a composite membrane according to this invention, on the other hand, the current is carried partly by migration of positive ions such as hydrogen ions, and partly by negative ions such as hydroxyls, with the result that the water produced by the cell reaction is produced partly at the positive and partly at the negative electrode.

In the second place, the phenomenon of electro-osmosis is "balanced" in the diaphragm electrolyte according to the present invention. As indicated above, the transport of water through the membrane follows the direction of the migrating ion, and is believed to be caused partly by ionic attraction or the like between the migrating ion and adjacent water molecule, and partly by hydrodynamic drag exerted by the moving ion on the surrounding liquid. In the conventional membrane electrolyte, there is only one species of mobile ion carrying the current, and the resulting electro-osmotic phenomena result in transport of water in only one direction. Furthermore, the transport of water resulting from electro-osmosis is toward the same electrode at which the reaction-product water is being produced, so that the two mechanisms reinforce each other, both tending to cause flooding of the membrane surface toward which the ions are migrating, and to dry out the other surface of the membrane. In the membrane according to the present invention, on the other hand, there are provided distinct but closely-adjacent regions wherein the current travels in the same direction, but the ions, and consequently the water, travel in opposite directions, so that the net effect is to keep the diaphragm wet on both sides.

It should be emphasized that there is no paucity of water overall in a fuel cell, for one of the products of combustion of any hydrogen-containing fuel with oxygen is water. The present invention provides a simple and effective means of returning an appropriate amount of this water and also the electro-osmotic water, back to the dry side of the cell.

The production of composite membranes having cation-conducting regions and anion-conducting regions may be effected in a variety of ways, each of which is effective to form a composite film having discrete regions, each being of a thickness coextensive with the thickness of the film, of which regions some are cation-conducting and others are anion-conducting. Some of the simplest and most advantageous of these methods are described as follows:

*Method 1.*—Strips of two sheets of the same matrix polymer or of compatible matrix polymers, one containing cation-exchange substituent groups and the other containing anion-exchange substituent groups, are laid down side by side on a flat surface and cemented together along their common edges to produce a composite membrane. The imprinting of a catalyst on one or more of the electrolyte membrane surfaces (e.g. platinum black on that surface of the cation-conducting portion which is adjacent the negative electrode) can be accomplished either before, during or after this fusion process. Such catalyst addition is not essential but is sometimes advantageous in promoting the electrochemical reactions which provide the source of energy delivered by the cell.

*Method 2.*—This method is essentially the same as Method 1, except that the strips are united in any convenient way appropriate to the nature of the matrix polymer, for example heat-sealing either as a butt or lap-joint, with or without a thin intermediate insert of unmodified matrix polymer to assist the bonding.

*Method 3.*—A sheet of polymer of one type is perforated to form holes, patches of the other type are spotted over the holes, and the whole is heat-sealed to form a continuous sheet having differentiated regions.

*Method 4.*—Any of the above methods may be varied by using solvent-sealing instead of heat-sealing methods.

*Method 5.*—A film of the type contemplated herein may be produced continuously by casting techniques, by feeding melts or solutions of the two polymer types simultaneously to the surface of the casting drum, at points spaced along a line parallel to the axis of the drum, so as to produce a film composed of alternate, parallel, contiguous strips of the two types of resin.

*Method 6.*—According to a variation of Method 5, a preformed, perforated or slotted sheet of one type of resin is passed over the casting drum, and the second type of resin is applied to the drum in melt or solution form, so that the perforations are filled with the second type of resin. The molten or dissolved resin will tend to selectively fill the perforations. If desired, a doctor knife or calender may be employed to remove any deposit of the second type on the unperforated areas of the preformed film.

*Method 7.*—A heterogeneous membrane is made by grinding separately an ion-exchange resin of Type A and suspending these particles in a solution of a matrix polymer in an inert solvent or a melt of a matrix polymer, including in the composition of this matrix polymer solution or melt a linear polyelectrolyte of Type B, then suspending the resin of Type A in the solution of melt and casting a heterogeneous film therefrom.

In practicing this method, it is important to avoid grinding the resin particles too fine. The resin particles should be ground to a particle diameter substantially smaller than the thickness of the finished membrane, but not so fine that the particles will be entirely individually surrounded by the matrix material. If the particles are ground too fine, there is danger of producing a membrane having substantial areas which are partly cationic and partly anionic through the thickness of the film. This is to be avoided because the cationic portion is anion-impermeable and the anionic portion is cation-impermeable, so that such an area, containing both species of resin, is impermeable to both ionic species and hence unavailable for direct current ionic conduction.

*Method 8.*—A film is cast in the form of a matrix of inert polymer containing particles of one type of resin. Prior to drying, the cast film is coagulated with a nonsolvent thereby producing large pores in the film. The film is then soaked in a polyelectrolyte of sign opposite to that of the resin particles originally present (Type B). The film is finally dried to reduce the size of the pores to an acceptable level.

In the practice of this method, because of surface tension effects, the polyelectrolyte will tend to selectively fill the large pores opened up by the coagulation step, instead of depositing on the surface of the film between the pores. The process therefore tends to produce the desired type of film—i.e. one in which the cationic regions are cationic, and the anionic regions anionic, through the full thickness of the film. Polyelectrolyte solutions of excessive viscosity, or which do not wet the coagulated film, sometimes tend to leave deposits of polyelectrolyte on the surface of the coagulated film between the pores, and are preferably avoided.

It is by no means necessary that the two species of exchange resin be present in amounts so as to constitute equal areas of the composite film, nor that they conduct equal proportions of the electric current, nor yet that they have similar water-transport characteristics. In most cases, it is desirable that the membrane areas of the two types of exchange resin be approximately inversely proportional to the rate at which they conduct water under the conditions obtaining in the particular system under consideration, so that a condition of dynamic equilibrium is established, in which there is substantially no net water transfer from either side of the composite membrane to the other, with the exception of the water which is the product of the combustion reaction. In particular cases, it may be desirable to provide for a net water transfer in one direction or the other. In such cases, this is readily provided for by appropriate selection of the respective ion-exchange species and appropriate adjustment of their relative areas.

In a particularly desirable embodiment of the present invention, a relatively small area of an exchange resin having relatively large pores, relatively high electrical resistance, and high hydrodynamic permeability is employed in conjunction with a relatively large area of an exchange resin of opposite sign, having relatively small pores, relatively low electrical resistance, and relatively low hydrodynamic permeability.

Characteristically, those resins which conduct the electric current most readily, are those which transport water least readily. They have relatively small pores containing a high concentration of fixed charge groups, and are characterized by specific ohmic resistances of 100–1000 ohm-cm. when measured in 0.001 M potassium chloride at 25° C. Their hydrodynamic permeabilities vary, but typically lie in the range between $6 \times 10^{-5}$ to $6 \times 10^{-4}$ ml. of water per hour per 100 cm.$^2$ of membrane area, measured on a membrane 0.01 cm. thick under a pressure difference of 400 p.s.i. at 25° C. For purposes of brevity, such a membrane is sometimes referred to herein as a "Type A" membrane. It may be either a cation-exchange or an anion-exchange membrane, but it is most commonly a caton-exchange membrane—i.e. it conducts electric current by migration of mobile cations such as hydrogen ions. Such membranes are well known to the art, and are described for example in such publications as those by Gregor et al., J. Phys. Chem. 61, 141 (1957) and J. Electrochem. Soc. 106, 1051 (1959). In general, such membranes have water contents in the range 10–40%. The pore diameters of such membranes are not well defined in terms of standard measurements, but on the basis of the technique described in the above cited article in J. Electrochem. Soc., they appear to be in the range of 8–15 Angstrom units. Such a membrane is described elsewhere herein as having relatively high electrical conductivity and relatively low hydrodynamic permeability.

The other general class of ion-exchange resins referred to herein is described as having relatively low electrical conductivity and relatively high hydrodynamic permeability, and for brevity, is sometimes referred to herein as "Type B." Membranes of such resins have relatively large pores containing a relatively low concentration of fixed charge groups. They may be either cation-exchange or anion exchange resins, but most commonly are anion-exchange resins. In the practice of this invention, it is important that the Type B resin selected be one having fixed-charge groups of sign opposite to the sign of those in the Type A resin used. The specific resistance of the Type B resin may vary from about 2,000 to about 200,000 ohm-cm. measured in 0.001 M KCl at 25° C., and the water permeability will vary from $6 \times 10^{-3}$ to 6 ml. of water per hour per 100 cm.$^2$ of membrane area at a thickness of 0.01 cm. and under a pressure difference of 400 p.s.i. The water content of such membrane is, in general from 50 to 90%, and their pore diameters are in the range from 20 to 1000 Angstrom units.

Although both the Type A and the Type B portions of the composite membrane of this invention carry electric current, it is advantageous to have the Type A resin account for the greater portion of the membrane area, because it has the better electrical characteristics, and to have present only enough Type B resin to establish the desired water-transport equilibrium condition. Therefore, although even small differences in hydrodynamic permeability are sufficient to provide beneficial effects according to the present invention, it is advantageous to have the difference in hydrodynamic permeability rather pronounced.

In some cases, the use of certain solvents is advantageous in effecting the sealing together of the two types of resin film. For example, where a homogeneous-type or heterogeneous-type polymer matrix such as Dynel (a copolymer of vinylchloride and acrylonitrile in approximately equal proportions) is the matrix polymer, a small amount of a ketone solvent or similar solvent allows the two films to be cemented together readily under moderate temperature and pressures.

The chemical constitution and nature of these sections of the membrane may vary widely, as will be appreciated by those skilled in the art, and the nature of the particular resins chosen is not important, provided one of them is cationic and the other anionic, and that one be a Type A resin and the other a Type B resin as hereinbefore described. All the conventional groups and molecular configurations are usable in the present invention.

Typical Type A resins and the preparation thereof are described in Belgian Patent No. 568,268, U.S. 3,004,904, and British Patent No. 862,229.

Typical Type B resins and their preparation are described in U.S. Patent No. 3,004,909.

Other than the above mentioned requirements as to the requisite difference between the properties of the resins elected, it is necessary only that they be sufficiently compatible chemically and physically to be joined to form a composite membrane as hereinbefore described.

The proportion of the current-carrying area (Type A) to that of the water-carrying area (Type B) will vary with the properties of each. For example, if 10 moles of water are transported per Faraday of current passed in the current-carrying section, at least 10 moles of water must be transported in the opposite direction by the water-carrying section. Ordinarily, it is preferred to return a greater amount of water to compensate for that lost by evaporation, etc.

In order to illustrate more fully the nature of the present invention and the manner of practicing the same, the following examples are presented:

EXAMPLE 1

Dry sheets of a cation-exchange membrane are prepared in known manner by forming a polystyrene-divinylbenzene cage polymer in a polyethylene matrix sheet and subsequently sulfonating. The resulting sheets are cut into strips 1.5 cm. wide. Cage polymer can be made as taught in Belgian Patent 568,268.

A dry anion-exchange membrane is made according to the same general technique but with less divinylbenzene (to provide greater swelling), the anion-exchange groups being introduced by chloromethylation of the styrene-divinylbenzene cage polymer, followed by treatment with trimethylamine, according to techniques also well known to the art. The resulting anion-exchange membrane was cut into strips 4 mm. wide.

The cation- and anion-exchange membrane strips are laid alternately onto a press, with a 1 mm. overlap at each boundary between adjacent strips, and subjected to a pressure of approximately 60,000 p.s.i. at approximately 205° F. for 3–4 minutes. During the course of this pressing operaton, the strips become fused together along their edges to form a continuous sheet.

The continuous sheet produced as just described may be incorporated into a fuel cell of conventional design, using hydrogen as the fuel and oxygen or air as the oxidant. If desired, the cell can be improved with respect to its current output by imprinting a catalyst onto the cation-exchange parts of the membrane. This may be done either before, concurrently with, or after the heat-sealing process, as the exigencies of the case may dictate. Normally, it is most convenient to apply the catalyst to the surface of the cation-exchange film before the latter is cut into strips.

The two sheets need not necessarily be made of the same matrix resin. They should, however, be heat-sealable to each other and for best results should be of approximately the same thickness.

EXAMPLE 2

The procedure of Example 1 was repeated, except that, in the heat-sealing operation, a 1 mm. strip of the matrix polymer (containing no ion-exchange groups) was laid over the butt joint, so as to slightly overlap the two adjoining edges. The assembly was then heat-sealed as described in Example 1. This process is advantageous in certain applications because it lends itself most readily to continuous operations.

EXAMPLE 3

A cation-exchange membrane casting solution is prepared by dissolving 3 parts of Dynel and 1 part of polystyrenesulfonic acid in 20 parts of N,N'-dimethylformamide as solvent. The polystyrenesulfonic acid is prepared according to any one of several conventional techniques, for example the direct sulfonation of linear polystyrene of molecular weight 30,000–70,000.

An anion-exchange membrane casting solution is prepared by dissolving 1 part of a solution of poly-N-vinyl-3-imidazolium iodide and 1 part of Dynel in 10 parts of N,N'-dimethylformamide.

The two solutions are fed separately to a casting drum at points spaced along a line parallel to the longitudinal axis of the drum. The resulting cast film is a continuous sheet characterized by differentiated regions in the form of parallel strips of cation- and anion-exchange resin. Such a film may be assembled into a fuel cell of conventional design, and the cell will produce electric current while avoiding the tendency to flood one side of the membrane and dry out the other, as previously described. This technique of casting cation-exchange and ion-exchange membranes in the form of a single film but with differentiated regions has many advantages, particularly in the continuous production of composite membranes.

EXAMPLE 4

2.5 parts of a sulfonated polystyrene cation-exchange resin with 8% cross-linking are ground dry to pass a 200-mesh screen, and then suspended in a solution of 1 part Dynel and 0.1 part of the polymer poly-N-vinyl-3-butylimidazolium iodide in 8 parts of N,N'-dimethylformamide. The resulting suspension is cast in the form of a film and allowed to dry. The resulting film is a useful electrolyte membrane for fuel cells as herein described.

EXAMPLE 5

A heterogeneous suspension is cast as described in Example 4, but the type B polyelectrolyte (poly-N-vinyl-3-butylimidazoliumiodide) is omitted. The film is cast, but prior to complete drying and while it contains approximately one-half of its original solvent content, the film is coagulated by spraying it with a fine mist of water. A number of macro-pores are thus opened up in the structure. This membrane is then soaked for 24 hours in a 5% aqueous solution of the same polyelectrolyte of type B employed in Example 4. The film is then withdrawn from the solution and dried in 30% relative humidity air. During this soaking operation, the macro-pores become filled with the polyelectrolyte, and upon drying, the resulting film is a heterogeneous film containing areas of type A and type B electrolyte of opposite sign, and is useful as a solid electrolyte membrane in fuel cells according to the present invention.

The membranes of this invention are to be distinguished from certain "mosaic" membranes which have from time to time been discussed in the published literature. In some cases, these were biological tissues such as cell walls and the like, which appear to have adjacent microscopic or submicroscopic areas of differing permeability characteristics, for example being permeable to water and/or aqueous solutions in one area, and to lipids or other fatty or oily substances in adjacent areas. So far as is known to the present inventor, the very existence of these "mosaic membranes" is somewhat hypothetical and inferential, based on attempts to explain certain experimentally observed phenomena, but not having been rigorously established nor duplicated in the laboratory. Such of these biological "mosaic membranes" as have been proposed, moreover, are not believed to include any which are of the type here described and claimed, having regions co-extensive with the thickness of the film which are cation-selective and others which are anion-selective.

Other so-called "mosaic membranes" have been reported in the literature. Although the "mosaic membrane" designation would appear, superficially, to suggest composite films similar to those of the present invention, the membranes so designated are quite different from those of the present invention, being in fact composites of two separate membranes, one on the inner and one on the outer surface of a supporting structure such as a porous ceramic cup or tube.

While this invention has been described in terms of certain preferred embodiments and illustrated by way of specific examples, these are illustrative only and the invention is not to be construed as limited, except as set forth in the appended claims.

I claim:

1. A fuel cell comprising in combination a positive electrode, a negative electrode, means for supplying an oxidant to said positive electrode, means for supplying a fuel to said negative electrode and an electrolyte between said electrodes and in contact with both of said electrodes, said electrolyte being composed of a solid mass of ion exchange resin having a plurality of regions including a first region extending through said electrolyte from said positive electrode to said negative electrode, said first region having only fixed ions of one electrical sign in association with exchangeable ions of opposite electrical sign, and a second region extending through said electrolyte from said positive electrode to said negative electrode, said second region having only fixed ions of electrical sign opposite the sign of the fixed ions in said first region, in association with exchangeable ions of electrical sign opposite the sign of the exchangeable ions in said first region, each of said regions being of a thickness coextensive with the thickness of said electrolyte.

2. A fuel cell according to claim 1, wherein said mass of ion-exchange resin is a film of ion-exchange resin.

3. A fuel cell according to claim 1, wherein the ion-exchange resin in said first region is characterized by relatively high electrical conductivity and relatively low water-permeability, and the ion-exchange resin in said second region is characterized by relatively low electrical conductivity and relatively high water-permeability.

4. A fuel cell according to claim 3, wherein said ion-exchange resin in said first region is a cation exchange resin and said ion exchange resin in said second region is an anion-exchange resin.

5. A fuel cell according to claim 4, wherein said first region is of greater area than said second region.

6. A fuel cell according to claim 3, wherein said ion-exchange resin in said first region is an anion-exchange resin and said ion-exchange resin in said second region is a cation-exchange resin.

7. A fuel cell according to claim 6, wherein said first region is of greater area than said second region.

8. A fuel cell according to claim 3, wherein the area of said first region is greater than the area of said second region, whereby the rate of water transport through said first region approximates the rate of water transport through said second region.

References Cited

UNITED STATES PATENTS

| | | | |
|---|---|---|---|
| 2,913,511 | 11/1959 | Grubb | 136—86 |
| 2,851,510 | 9/1958 | Pauli | 136—153 XR |
| 3,227,662 | 1/1966 | Kollsman | 260—2.1 |
| 3,276,909 | 10/1966 | Moos | 136—86 |
| 3,284,238 | 11/1966 | White | 136—153 XR |

WINSTON A. DOUGLAS, Primary Examiner

D. L. WALTON, Assistant Examiner

U.S. Cl. X.R.

136—53; 260—2.1